United States Patent [19]
Isbell

[11] 4,380,889
[45] Apr. 26, 1983

[54] CUTTER BAR FOR RICE COMBINES

[76] Inventor: Benny Isbell, P.O. Box 195, Humnoke, Ark. 72072

[21] Appl. No.: 323,718

[22] Filed: Nov. 23, 1981

[51] Int. Cl.³ ........................................... A01D 55/02
[52] U.S. Cl. ..................................................... 56/296
[58] Field of Search .................................. 56/296–313, 56/14.5, 14.6, 257, 264

[56] References Cited

U.S. PATENT DOCUMENTS

| | | | |
|---|---|---|---|
| 3,098,338 | 7/1963 | Myers | 56/296 |
| 3,760,571 | 9/1973 | Foster | 56/298 |
| 4,198,803 | 4/1980 | Quick et al. | 56/296 |

FOREIGN PATENT DOCUMENTS 6702542  2/1967  Netherlands ........................ 56/296

*Primary Examiner*—Jay N. Eskovitz
*Attorney, Agent, or Firm*—Robert R. Keegan

[57] ABSTRACT

There is disclosed an improved reaper assembly for a rice combine having two cutter bars with triangular blades, one of which is stationary, and the other of which is reciprocated by a driver arm. All of the triangular cutting blades have sharp serrated edges and the blades of one bar are of a different dimension than the blades of the other bar, the blades preferably having a width ratio of three to two; the blades are secured to the bars with rivets or similar fasteners so that broken or damaged blades may be conveniently replaced; the stationary cutter bar is provided with holes matching the usual holes on the combine cutter mounting bar so that it may be attached with bolts to replace standard guards and ledger plates; the original bolts also may be employed to secure holddown clips which hold the reciprocating cutter bar against the stationary cutter bar while allowing the reciprocating cutter bar to slide freely.

12 Claims, 6 Drawing Figures

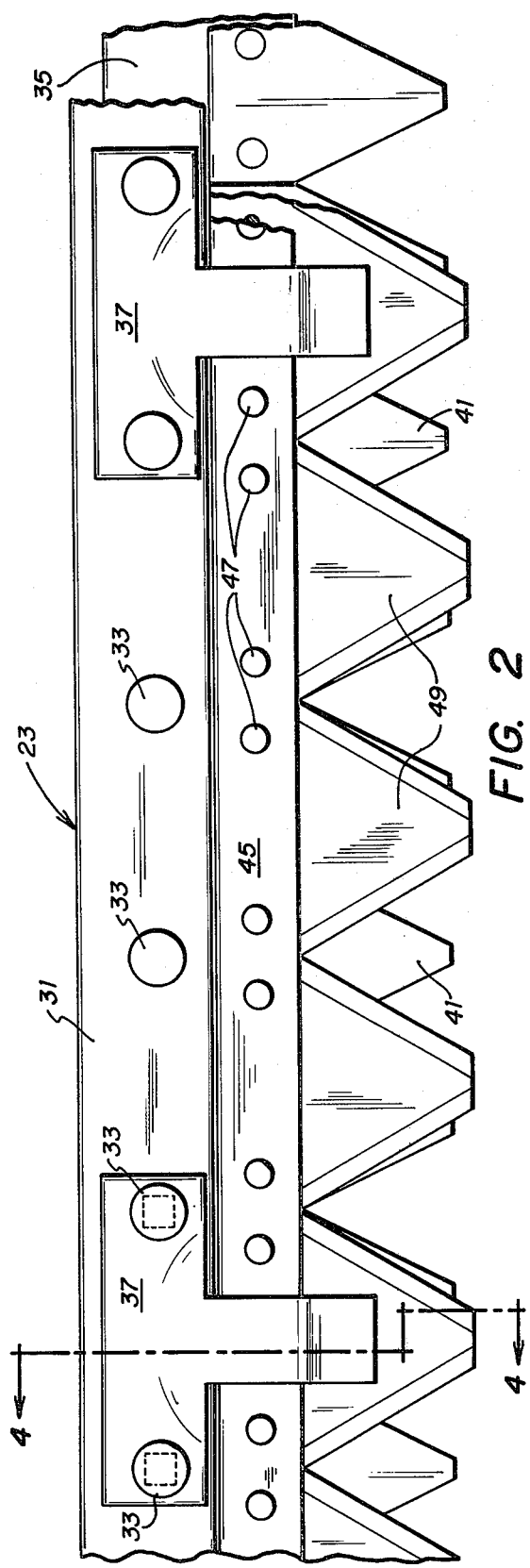
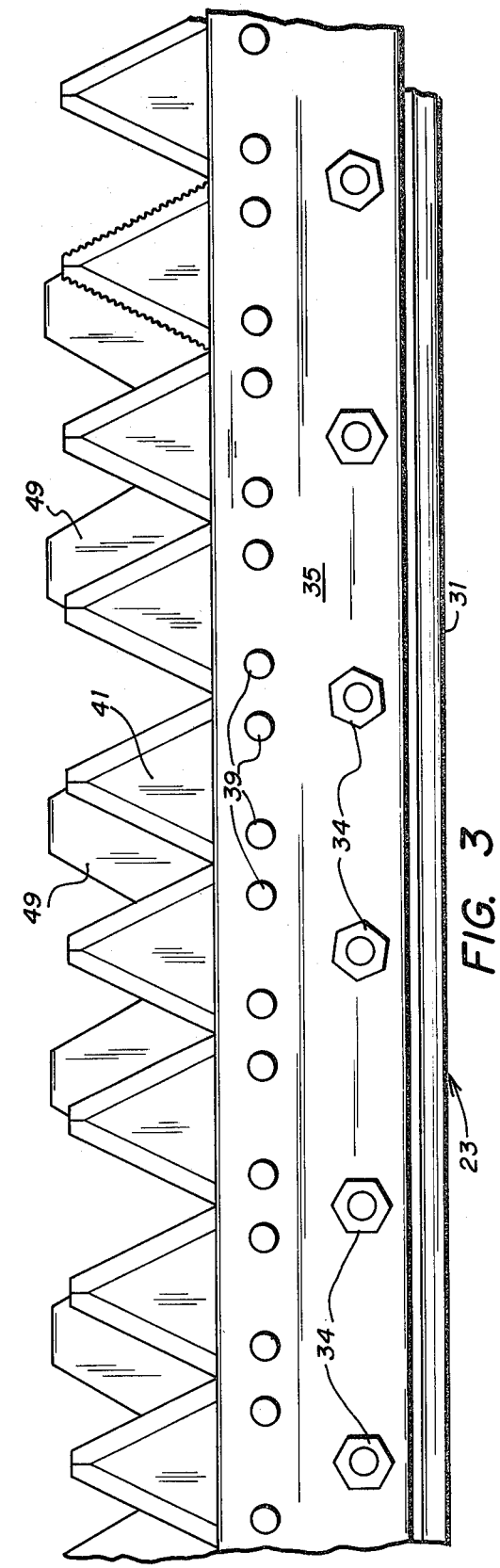

CUTTER BAR FOR RICE COMBINES

The present invention relates to an improvement in cutting bars for the reaper assembly of combines or the like, and it is particularly useful when incorporated in rice combines for rapid and efficient harvesting of "down" rice. It is often necessary to harvest rice under wet field conditions and not infrequently due to weather conditions such as heavy wind and rain, much of the rice may be bent or broken; such "down" rice is difficult to harvest with a good recovery rate and reasonable speed. The speed of operation is especially important because in such circumstances the conditions of the crop are likely to be deteriorating while the harvest is under way. Thus the faster it can be accomplished the greater the amount of the crop that can be saved.

Conventional reaper assemblies for combines include a reel for gathering the standing crop into the mouth of the combine and a cutter assembly for cutting the stalks of the grain, usually adjustable in height above the ground level. Combines, including rice combines, generally have been provided with a cutter assembly which included a sickle bar mounted under the reel with numerous cutting teeth or blades spaced therealong. The teeth of the sickle were matched with stationary fingers of a guard bar which extended forward somewhat beyond the forward end of the sickle teeth. The fingers held the grain stalks for cutting by the sickle teeth and also provided some protection for the sickle teeth in preventing larger objects or materials from reaching the teeth of the sickle bar. This prior conventional arrangement was primarily intended for cutting standing grain, including rice, with good speed and efficiency. However, the use of such conventional cutting assemblies in harvesting of down rice and other troublesome crops was found to present serious difficulties. Wet fallen rice was not effectively cut by the single sickle cutter blade cooperating with the stationary fingers and the rice stalks would fail to be cut and would tend to jam the equipment. Due to the circumstances encountered in rice harvesting, one would prefer to avoid any difficulty that would involve stopping the equipment, backing up, and/or restarting it due to the significant danger of becoming stuck in flooded fields.

The present invention departs from the customary single sickle reaper arrangement in general use and provides two cutting bars, one of which reciprocates in close contact with the other, providing a scissors-like cutting action from dozens of blade pairs distributed the full width of the reaper assembly of the combine. The blades are not protected by fingers, but they are arranged so that a broken or damaged blade may easily be replaced. The cutter bar blades are sharp and preferably serrated to produce a highly effective scissors or shearing action. Furthermore, the blades are dimensioned to produce a staggered relation so that the load on the drive mechanism and the cutting rate is more uniform. The physical arrangement of the blades and bars is such that the device is very rugged and at the same time easy to maintain. The double cutting bar arrangement according to the invention is a direct replacement for prior single bar and finger guard arrangements and may be substituted in most existing machinery in a relatively short time by a person with only ordinary mechanical skill.

Much of a combine's efficiency to thresh and separate the crop is related to clean, smooth and even cutting of the material by the reaper assembly before the feeding into the table threshing and separating units.

The improved cutter bars according to the invention practically eliminate all feeding problems in providing clean and even cutting—even in the most adverse conditions. In combining down rice, which is often wet or even lying down in water, most combines with standard sickles will average little more than 10 to 12 acres per day. This acreage may be increased to 17 to 24 acres per day, speeding the harvest in a critical time situation. Even in good harvest conditions, with little or no down rice a 10% increase in combine production may be achieved.

By eliminating standard guards and ledger plates the improved reaper assembly cuts all straw stalk grains without "balling up" even in the most adverse conditions. This results in even feeding of the material onto the header and into the combine cylinder threshing and separating units. When these units stay "full", particularly late model combines with large capacities, production and efficiency are significantly increased.

While reapers with double cutter bar arrangements have been known and others with serrated blades have been employed, applicant's combination as a whole provides an improved cutter assembly for rice combines and similar equipment with advantages not present in prior apparatus.

In addition to providing the features and advantages discussed above, it is an object of the present invention to provide a cutter assembly for a combine wherein double cutter bars are closely spaced with relative sliding motion to provide a scissors-like action which is particularly effective in reaping down rice and other hard to harvest crops.

It is another object of the present invention to provide an improved cutter assembly for a combine in which double cutter bars are arranged so that cutting action is continuous and substantially uniform thereby reducing the load on the cutter drive unit.

It is still another object of the present invention to provide a reaper assembly in which the cutter assembly is simple and trouble-free and can be replaced in part or entirely with a minimum effort and loss of time in the event of damage.

Other objects and advantages will be apparent from the following description in conjunction with the appended drawings in which:

FIG. 2 is a top plan view thereof;

FIG. 3 is a bottom plan view thereof;

Figure 5:
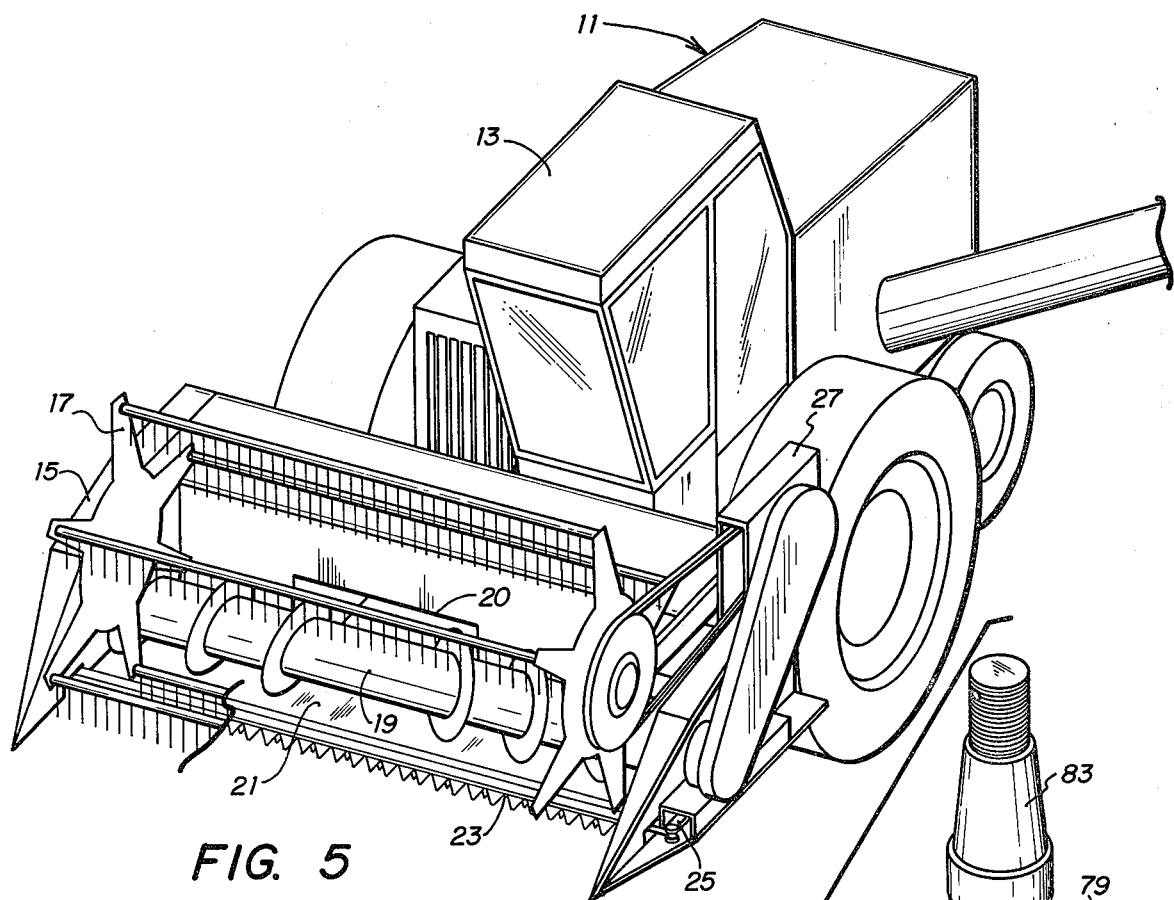
FIG. 5 is a simplified perspective view of a combine incorporating the improved cutter assembly according to the invention.

A generalized showing of a grain combine 11 is shown in FIG. 5. A self-propelled vehicle 13 has on the forward end thereof a reaper assembly 15 including a reel 17, a header 21, a cutter assembly 23, and a cutter drive unit 25. The reaper assembly serves to cut the grain after which an auger 19 transports the grain from the header 21 to an opening 20 leading to the thresher and separator unit in the interior of the combine 11. The reaper assembly 15 is normally considerably wider than the vehicle body of the combine 11 and may typically be between 18 and 22 feet in width. A narrow version of the normal reaper assembly is shown in FIG. 5 for convenience of illustration. The present invention deals only with the reaper assembly of the combine and the other portions are not shown or described in detail.

The details of the cutter assembly according to the invention will be explained with reference to FIGS. 1 through 4, and FIG. 6. Referring particularly to FIGS. 1-4, the cutter assembly 23 is mounted on a header bar 31 also referred to as a cutter mounting bar. The header bar or cutter mounting bar is a conventional element of the combine 11 forming the front edge of the header 21.

It will be noted, especially in FIG. 2, that the cutter assembly 23 includes the header bar 31 which forms the leading edge of the header 21 of FIG. 5. Bolts 33 pass through openings in header bar 31 which may be on three inch centers, for example. Bolts 33 serve to connect a lower or fixed cutter bar 35, best seen in FIG. 3, to the header bar 31. Hold-down clips 37 are also secured in place by bolts 33 and nuts 34. Hold-down clips 37 may be spaced as shown in FIG. 2 at four times the spacing of bolts 33, or on twelve inch centers. For convenience, the lower cutter element may be divided into two foot sections consisting of fixed cutter bars 35.

Figure 4:
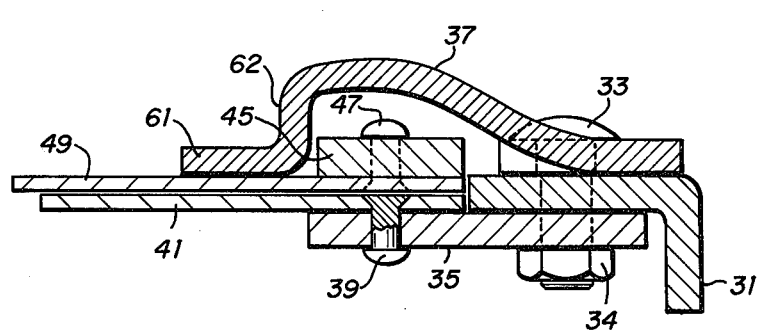
FIG. 4 is a sectional view taken along the line 4—4 in FIG. 2.

Each lower fixed cutter bar 35 has secured thereto a plurality of lower cutter blades 41. Blades 41 are preferably secured by fasteners such as rivets 39 in a manner that will facilitate replacing a damaged or broken blade. Each blade 41 is secured by a pair of rivets 39 as best seen in FIGS. 3 and 4. Blades 41 are approximately two inches wide at the base and are located on two inch centers on a fixed cutter bar 35. Lower cutter bar 35 is wide enough to extend most of the way from the inside corner of the L-shaped header bar 31 (as seen in FIG. 4) to at least about three quarters of an inch beyond the front edge of header bar 31 thus providing about an inch of overlap between blade 41 and cutter bar 35.

An upper cutter bar 45 having upper cutter blades 49 secured thereto on three inch centers is slidably mounted above lower cutter bar 35 so that the rear edges of blades 41 and blades 49 are approximately in alignment. Blades 49 are wider at the base than blades 41 in a ratio of three to two, and they will normally be somewhat deeper so that they extend farther forward than do blades 41. Both blades 41 and blades 49 are shown with the forward point of the triangular blade cut off to make the forward edge of the blades somewhat blunt. Alternatively the blades may be more or less pointed than shown in FIGS. 2 and 3. The blades are somewhat less subject to breaking or being damaged if they are formed with blunt leading edges, but if the blunt edge is made too broad the cutting action may be less effective.

Figure 1:
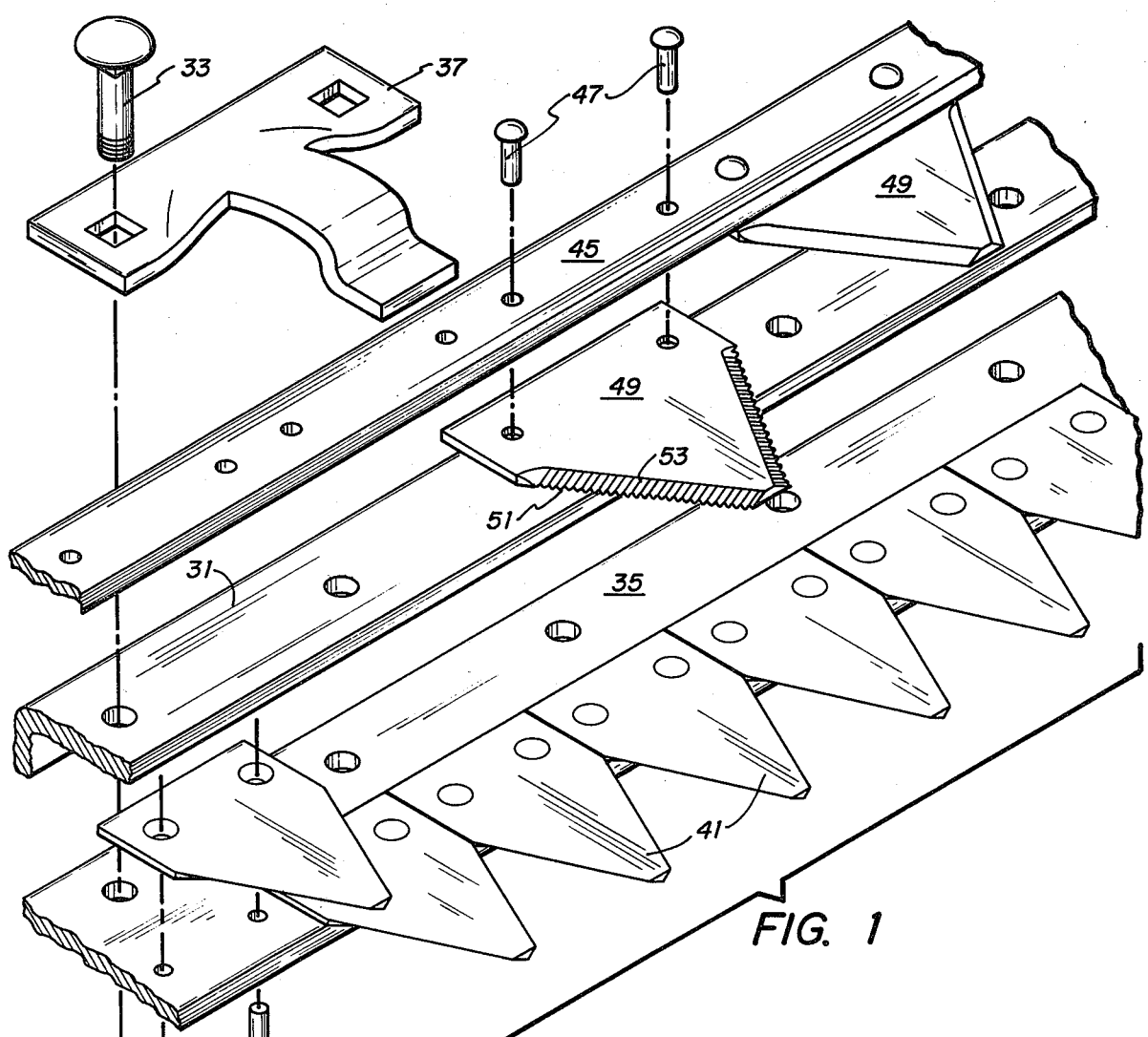
FIG. 1 is an exploded isometric fragmentary view of a portion of an improved cutter assembly according to the invention.

In the embodiment illustrated the blades 49 as well as the blades 41 have sharp beveled edges 53 and are also provided with serrations 51 as shown in FIGS. 1 and 3 (only one of the blades is shown with these details to simplify the illustration but it will be understood that all blades in this embodiment have the tapered edges and serrations). The serrations are preferably formed by grooves in the beveled surface 53 thereby producing a very sharp serrated cutting edge.

As shown best in FIG. 4, the hold-down clip 37 forms an arch or bridge over upper cutter bar 45 and has a horizontal foot portion 61 which bears against the top surface of a blade 49. A vertical portion 62 of hold-down clip 37 prevents upper cutter bar 45 from moving forward (to the left in FIG. 4) thus constraining cutter bar 45 with blades 49 to a sliding motion from left to right across the front of the combine reaper assembly.

Figure 6:
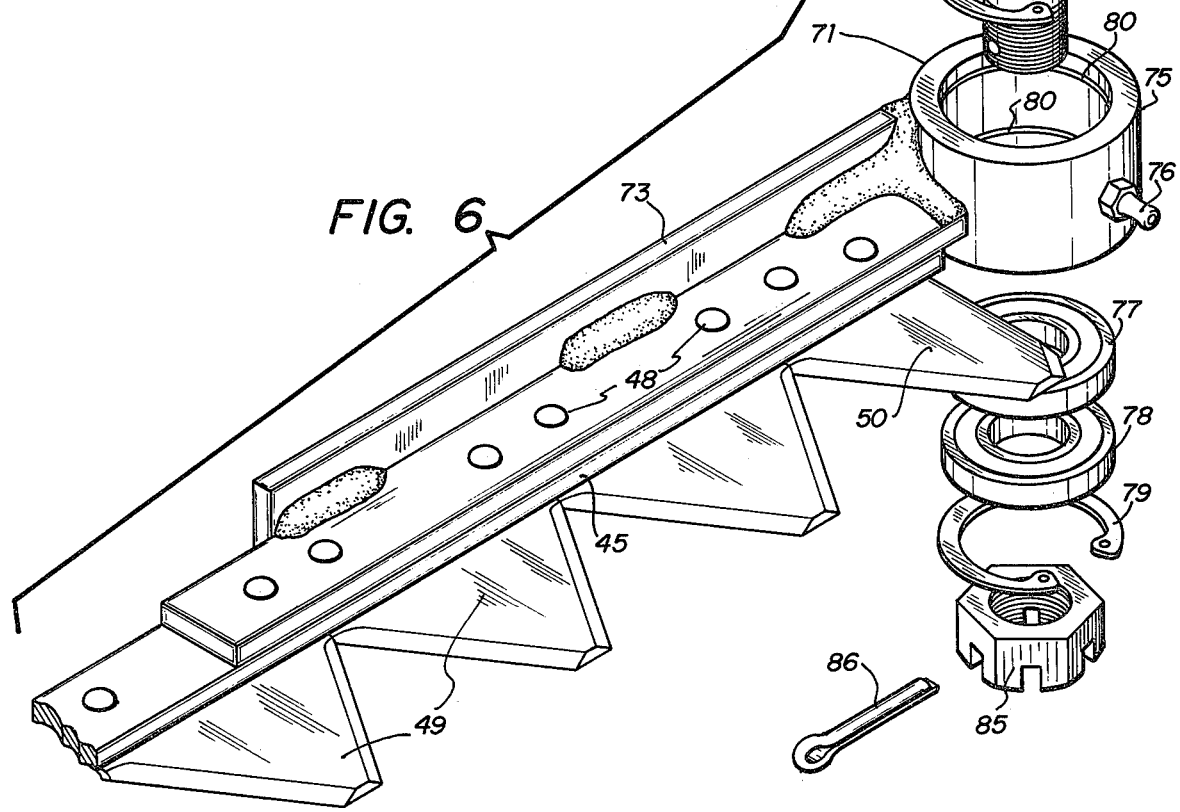
FIG. 6 is an isometric fragmentary view of one end of the upper cutter bar with a drive arm attached and showing the drive pin assembly in exploded form.

The improved cutter assembly of the invention is designed as a direct replacement for the usual combine sickle bar and accordingly it is provided with a coupler assembly 71 as shown in FIG. 6. A coupler arm 73 is secured in any suitable manner to the end of upper bar 45. As shown in FIG. 6 it may be secured in place utilizing slightly longer rivets 48 as compared with the rivets 47 utilized to secure blades 49 in place and with rivets 48 extending through arm 73, bar 45 and blades 49. Upper cutter bar 45 is cut to the appropriate length to fit a particular combine on which the improved cutter assembly is being installed. It may be desirable to utilize a half blade 50 as shown in FIG. 6 to match the width of the combine reaper assembly to within an inch. Arm 73 may be formed with an L-cross section for rigidity and has secured to the end thereof a bearing housing 75 with a grease fitting 76. A pair of anti-friction bearings 77 and 78 are secured in bearing housing 75 by snap rings 79 which engage snap ring grooves 80. A drive pin 83 adapted to couple to the driver arm of the combine is supported in the inner races of bearings 77 and 78, and is secured therein by a nut 85 and cotter pin 86 or other suitable means. Coupling assembly 71 thus provides a pivotal linkage between reciprocating upper cutter bar 45 and the cutter bar driver arm 25 of the combine.

Pin 83 is formed in a shape particularly adapted to cooperate with the drive arm coupling arrangement of a combine produced by a particular manufacturer. For other types of combines pin 83 would be replaced by a pin of different shape or by a standard bolt to provide the desired coupling. With this pin replacement, coupling assembly 71 is suitable for various types of combines.

Modification of the combine reaper assembly 15 to incorporate the double cutter bar may be accomplished by a mechanic of ordinary skill using conventional agricultural implement tools. Typical conversion procedure would involve using a one-half inch impact wrench to remove standard guards, hold-down clips, and sickle from the combine header. The upper cutter bar is cut to a length one-half blade to a full blade longer than the standard sickle bar.

Starting at the drive coupler end of the combine header the bottom cutter bar is bolted with blades flat side up. The bottom cutter bar is preferably formed in 24-inch sections and the appropriate number of sections is utilized to accommodate the width of the combine which is virtually always a multiple of two feet.

Normally the original guard retaining bolts may be employed to secure the lower cutter bar sections in place; preferably the bolts for the hold-down clip positions are left for later installation. If necessary the sections of the lower cutter bar may be ground or cut to assure a good fit without overlap and the last bottom section may be cut to fit, if necessary, with a hacksaw or cutting torch.

The upper cutter bar may be slid into place; obviously all operations need to be done cautiously with due regard to possibility of injury from the sharp upper and lower blades. For this reason avoidance of use of hand wrenchs is strongly recommended.

The upper cutter bar is now connected to the combine cutter drive arm using pin 83 or the other appropriate device for the particular combine involved. In general the hold-down clips supplied as original equipment may be re-installed and will provide satisfactory operation. The original clips may differ in appearance from hold-down clips 37 which are provided, if needed, as a part of the conversion unit. The original hold-down clips and possibly the conversion hold-down clips 37 will require adjustment to provide proper tolerance between hold-down clips and the reciprocating upper cutter bar 45, or more particularly the upper cutter bar blades 49. Customarily the hold-down clips will be too tight and may be raised by striking the rear of the in-place hold-down clip with a ballpeen hammer or other suitable instrument. The clip is tightened by striking the front of the hold-down clip with a hammer, preferably while holding the clip with vise-grip pliers.

The cutter assembly is lubricated with motor oil of medium gravity along its entire length and particularly along the backside and around the hold-down clips. Proper adjustment of tolerance of the hold-down clips may be checked by the temperature of the clips after a few minutes running. The clips should be warm to touch, and any higher temperature indicates insufficient tolerance or undue tightness of the particular clip.

No radically different operation of the combine is required with the double bar cutter according to the invention; however, best results will generally be obtained by adjustment of the table auger down and back as far as possible without the auger touching the table. Also, the pickup reel should be in neutral pitch position with reel fingers perpendicular to the ground and the reel speed should be slightly faster than ground travel speed.

The following explanation of the operation of the device will refer to characteristics which are believed to contribute to the improved operations provided by the invention, but no reliance is placed upon the theory of operation of the apparatus in statements concerning advantages of the invention. Statements concerning the superior performance of combines equipped with the improved cutter assembly according to the invention are based essentially on actual performance. The double cutting blade arrangement of the present invention provides a shearing or scissors action of one sharp upper blade against a sharp lower blade. Thus the grain stalks are cut cleanly by apparatus according to the invention and are not subjected to a breaking or crushing action as may sometimes occur in prior devices. The apparatus of the present invention may be contrasted to an old fashioned hand wielded sickle or scythe which cut the grain stalks by virtue of its fairly rapid motion and the sharpness of the blade. Rapid motion of a sharp single blade is also a factor in conventional sickle bar reaper mechanisms. In apparatus according to the present invention some cutting may take place before the shearing action of the double cutting blades takes effect but no reliance is placed on this as the grain stalks cannot escape the double blade shearing action.

The serrations present on at least one of the two sets of blades, and preferably both sets of blades, contribute to the efficiency of the cutter assembly action. As the action of the pair of blades causes a particular V-shaped gap to close there would be a tendency for the grain stalks caught in the gap to be pushed forward with the possibility that they might escape the shearing action. However, since the blades (preferably both upper and lower blades) are serrated as well as being sharp, the grain stalks are effectively prevented from sliding forward in the closing V-shaped gaps between blades but rather are caught by the serrations until sheared by the closing blades. When the blades are opening a gap, the serrations permit the grain stalks to slide into the apex of the gap with little impediment.

Another important feature of the cutter assembly is the relationship between the width of the upper and lower blades, in the specific embodiment this is a relationship of three to two. The larger and wider blades are the reciprocating blades in the preferred embodiment but that relationship could be reversed. Also the relationship between the large and small blades could be four to three, five to three, or any relation of small relatively prime numbers. The blades should neither be the same size nor should the sizes have an integer multiple relation such as two to one or three to one. The relationship of three to two has the advantage that with three inch and two inch blades there are exactly eight three-inch blades and twelve two-inch blades to two feet, and the cutter bars are multiples of two feet in total length.

The unequal size of upper and lower cutter blades provides a staggered relationship in the blades which has an advantage that can be understood from consideration of operation of a cutter assembly in which the size of the blades was equal. With equal size blades one would have a number of V-shaped gaps which open and close simultaneously. As one V-shaped gap is closing an adjacent V-shaped gap is opening. When a V-shaped gap is just starting to close and is of the maximum width the quantity of grain in the gap tends to be a maximum and the cutting load on the cutter bars and drive mechanism is at a maximum. This maximum occurs for all pairs of blades at the same time. On the other hand in applicant's apparatus with staggered blades the cutting action of adjacent blade pairs is out of synchronism and when the maximum cutting load is experienced by one-half of the blade pairs the minimum cutting load is being experienced by the other half of the blade pairs. This not only has the effect of reducing the maximum load on the drive mechanism and promoting more smooth running of the cutter assembly, but it also evens out the cutting action of the grain stalks so that the crop is fed more evenly into the auger and the thresher mechanism.

The combination of features of the cutter assembly according to the present invention provides a very significant improvement in effectiveness for the combine apparatus which is especially important in harvesting down rice or other difficult harvest conditions as previously discussed.

In addition to the variations and modifications to the apparatus according to the invention which have been described or suggested, other variations and modifications will be apparent to those skilled in the art and accordingly the scope of the invention is not to be considered to be limited to the particular embodiments shown or described, but is rather to be determined by reference to the appended claims.

What is claimed is:

1. In a grain reaper for a rice combine or the like having a reel, a cutter mounting bar mounted below said reel, and a reciprocating driver arm for a cutter blade bar, an improved reciprocating cutter assembly comprising, a stationary cutter element having a length not substantially less than the width of said reel, said stationary cutter element including a plurality of fixed bars having mounting holes near the rear edge thereof to accept fasteners for mounting to the under side of said cutter mounting bar, holes near the forward edge thereof for the attachment of cutting blades and further having a width sufficient to extend forward of the front edge of said cutter mounting bar, a plurality of fixed cutting elements with triangular blades secured along the top of said bars with a predetermined fixed blade pitch of two inches, each of said elements having a pair of holes therein and being secured by rivets passing through said pair of holes and corresponding holes in said fixed bars, a moving cutter bar at least substantially as long as said stationary cutter element with means for coupling one end thereof to said reciprocating driver arm, a plurality of generally triangular moving cutting blades secured along the bottom of said moving cutter bar with a predetermined moving blade pitch of three inches, said blades being secured by removable fasteners, each said moving blade having two sharpened serrated cutting edges, said moving cutter bar being mounted above said fixed bars just forward of said cutter mounting bar with the rear of the fixed cutting blades and the rear of said moving cutting blades approximately in alignment, a plurality of hold-down clips being secured at their rear ends to said cutter mounting bar, having an arch extending over said moving cutter bar, and having a foot at the front end in sliding contact with the upper surface of said moving cutting blades.

2. Apparatus as recited in claim 1 wherein said fixed cutting blades have serrated cutting edges adjacent to one another.

3. In a grain reaper for a rice combine or the like having a reel, a cutter mounting bar mounted below said reel, and a reciprocating driver arm for a cutter blade bar, an improved reciprocating cutter assembly comprising, a stationary cutter element having a length not substantially less than the width of said reel, said stationary cutter element including a plurality of fixed bars having mounting holes near the rear edge thereof to accept fasteners for mounting to the under side of said cutter mounting bar and further having a width sufficient to extend at least about three-quarters of an inch forward of the front edge of said cutter mounting bar, a plurality of generally triangular fixed cutting blades secured along the top of said fixed bar adjacent to one another with a predetermined fixed blade pitch of from one to five inches, said blades being secured by removable fasteners, each said blade having two sharpened serrated cutting edges, a moving cutter bar at least substantially as long as said stationary cutter element with means for coupling one end thereof to said reciprocating driver arm, a plurality of generally triangular moving cutting blades secured along the bottom of said moving cutter bar with a predetermined moving blade pitch of from one to five inches, said blades being secured by removable fasteners, each said blade having two sharpened serrated cutting edges, said moving cutter bar being mounted above said fixed bars just forward of said cutter mounting bar with the rear of the fixed cutting blades and the rear of said moving cutting blades approximately in alignment, one of the fixed blade pitch or the moving blade pitch being related to the other in the ratio of two small relatively prime numbers, and a plurality of hold-down clips being secured at their rear ends to said cutter mounting bar, having an arch extending over said moving cutter bar, and having a foot at the front end in sliding contact with the upper surface of said moving cutting blades.

4. Apparatus as recited in claim 3 wherein said removable fasteners are rivets which have a flattened end, approximately flush with the surfaces of said blades.

5. In a grain reaper for a rice combine or the like having a reel, a cutter mounting bar mounted below said reel, and a reciprocating driver arm for a cutter blade bar, an improved reciprocating cutter assembly comprising, a stationary cutter element, said stationary cutter element being mounted to said cutter mounting bar and further having a width sufficient to extend forward of the front edge of said cutter mounting bar, a plurality of generally triangular fixed cutting blades secured along the top of said stationary cutter element, a moving cutter bar at least substantially as long as said stationary cutter element with means for coupling one end thereof to said reciprocating driver arm, a plurality of generally triangular moving cutting blades secured along said moving cutter bar adjacent to one another, said blades being secured by removable fasteners, said moving cutter bar being mounted juar forward of said cutter mounting bar with the rear of the fixed cutting blades and the rear of said moving cutting blades approximately in alignment, one of the fixed blade pitch or the moving blade pitch being related to the other in the ratio of two small relatively prime numbers, and a plurality of hold-down clips being secured to said cutter mounting bar, and having a foot at the front end in sliding contact with said moving cutting blades.

6. Apparatus as recited in claim 5 wherein said fixed cutting blades have serrated cutting edges.

7. Apparatus as recited in claim 6 wherein said fixed cutting blades are adjacent to one another.

8. Apparatus as recited in claim 5 wherein said fixed cutting blades are adjacent to one another and have serrated cutting edges.

9. In a grain reaper for a rice combine or the like having a reel, a cutter mounting bar mounted below said reel, and a reciprocating driver arm for a cutter blade bar, an improved reciprocating cutter assembly comprising, a stationary cutter element having a length not substantially less than the width of said reel, said stationarcy cutter element including a plurality of fixed bars having mounting holes near the rear edge thereof to accept fasteners for mounting to the under side of said cutter mounting bar and further having a width sufficient to extend forward of the front edge of said cutter mounting bar, a plurality of generally triangular fixed cutting blades secured along said fixed bars with a predetermined fixed blade pitch of from one to five inches, a moving cutter bar at least substantially as long as said stationary cutter element with means for coupling one end thereof to said reciprocating driver arm, a plurality of generally triangular moving cutting blades secured along said moving cutter bar with a predetermined moving blade pitch of from one to five inches, said moving cutter bar being mounted above said fixed bars just forward of said cutter mounting bar with the rear of the fixed cutting blades and the rear of said moving cutting blades approximately in alignment, one of the fixed blade pitch or the moving blade pitch being related to the other in the ratio of two small relatively prime numbers, and a plurality of hold-down clips being secured to said cutter mounting bar, and having a foot at the front end in sliding contact with said moving cutting blades.

10. Apparatus as recited in claim 9 wherein said moving cutting blades have serrated edges.

11. Apparatus as recited in claim 10 wherein said moving cutting blades are secured in place by removable fasteners.

12. In a grain reaper for a rice combine or the like having a reel, a cutter mounting bar mounted below said reel, and a reciprocating driver arm for a cutter blade bar, an improved reciprocating cutter assembly comprising, a stationary cutter element, said stationary cutter element being mounted to said cutter mounting bar and further having a width sufficient to extend forward of the front edge of said cutter mounting bar, a plurality of generally triangular fixed cutting blades having serrated cutting edges secured along the top of said stationary cutter element, a moving cutter bar a least substantially as long as said stationary cutter element with means for coupling one end thereof to said reciprocating driver arm, a plurality of generally triangular moving cutting blades having serrated cutting edges secured along said moving cutter bar adjacent to one another, said moving cutter bar being mounted just forward of said cutter mounting bar with the rear of the fixed cutting blades and the rear of said moving cutting blades approximately in alignment, one of the fixed blade pitch or the moving blade pitch being related to the other in the ratio of two small relatively prime numbers, and a plurality of hold-down clips being secured to said cutter mounting bar, and having a foot at the front end in sliding contact with said moving cutting blades.

* * * * *